United States Patent
Al-Mahdawi

(10) Patent No.: US 11,901,977 B2
(45) Date of Patent: Feb. 13, 2024

(54) DELAY COMPENSATED ANALOG BEAM FORMING NETWORK

(71) Applicant: BAE Systems Information and Electronic Systems Integration Inc., Nashua, NH (US)

(72) Inventor: Tareef Al-Mahdawi, Escondido, CA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 206 days.

(21) Appl. No.: 17/576,564

(22) Filed: Jan. 14, 2022

(65) Prior Publication Data

US 2023/0231599 A1    Jul. 20, 2023

(51) Int. Cl.
*H04B 7/0426* (2017.01)
*H04B 7/0456* (2017.01)
*H04B 7/08* (2006.01)

(52) U.S. Cl.
CPC .......... *H04B 7/043* (2013.01); *H04B 7/0473* (2013.01); *H04B 7/086* (2013.01)

(58) Field of Classification Search
CPC ...... H01Q 3/2682; H01Q 3/26; H01Q 3/2658; H01Q 3/2694; H01Q 3/2688; H04B 7/043; H04B 7/0473; H04B 7/086; H04B 7/08; H04B 7/0828; H04B 7/0891; H04B 7/0894; H04B 7/0897; H04B 7/06; H04B 7/0613; H04B 7/0667; H04B 7/0671

See application file for complete search history.

(56) References Cited

U.S. PATENT DOCUMENTS

| | | | | |
|---|---|---|---|---|
| 6,104,673 A * | 8/2000 | Cole | ................... | G01S 15/8915 367/138 |
| 7,526,266 B2 * | 4/2009 | Al-Mahdawi | .......... | H04B 1/525 455/296 |
| 7,642,963 B2 * | 1/2010 | Apostolos | ................. | G01S 5/04 342/375 |
| 7,877,074 B2 * | 1/2011 | Al-Mahdawi | .......... | H04B 1/525 455/296 |
| 7,986,753 B1 * | 7/2011 | Roy | ................. | H03M 13/4107 714/755 |
| 8,004,468 B2 * | 8/2011 | Al-Mahdawi | ........ | H01Q 25/005 343/846 |

(Continued)

*Primary Examiner* — James M Perez
(74) *Attorney, Agent, or Firm* — Finch & Maloney PLLC

(57) ABSTRACT

Techniques are provided for a delay compensated analog beam forming network. A transceiver implementing the techniques according to an embodiment includes an array of circuit elements. Each of the circuit elements includes an analog frequency converter to up-convert an analog signal to radio frequency (RF) for transmission and to down-convert an RF signal to an analog signal for reception. The circuit element also includes an analog beam weighting circuit configured to apply a beam weight to both of the analog signals to form a beam for transmission and reception. The circuit element further includes an analog delay element configured to impart a time delay to the analog signals. The time delay is based on the position of the circuit element in the array and is selected to compensate for propagation delay of the analog signals along the electrical path that couples the circuit elements of the array, reducing beam squint.

20 Claims, 10 Drawing Sheets

(56) References Cited

U.S. PATENT DOCUMENTS

| | | | | |
|---|---|---|---|---|
| 8,466,848 | B2* | 6/2013 | Guy | H01Q 21/22 343/853 |
| 8,570,172 | B2 | 10/2013 | Al-Mahdawi | H04B 17/27 340/572.1 |
| 8,923,381 | B2* | 12/2014 | Rilling | H04L 27/38 375/147 |
| 9,628,162 | B1* | 4/2017 | Chieh | H04B 1/0025 |
| 10,163,178 | B1* | 12/2018 | Sprogis | G06Q 50/30 |
| 10,181,862 | B1* | 1/2019 | Marr | H03M 3/396 |
| 10,263,685 | B1* | 4/2019 | Kochetkov | H04B 1/16 |
| 10,461,753 | B1* | 10/2019 | Pritchard | G06F 1/12 |
| 10,505,602 | B1* | 12/2019 | Khan | H04B 7/0456 |
| 10,707,974 | B1* | 7/2020 | Ho | H04W 72/29 |
| 10,714,840 | B1* | 7/2020 | West | H01Q 21/30 |
| 11,290,077 | B2* | 3/2022 | Jakobsson | H03G 3/3036 |
| 11,520,001 | B1* | 12/2022 | Al-Mahdawi | G01S 5/06 |
| 2004/0087294 | A1* | 5/2004 | Wang | H04B 7/084 455/273 |
| 2006/0183454 | A1* | 8/2006 | Al-Mahdawi | H04B 1/525 455/296 |
| 2008/0062044 | A1* | 3/2008 | Al-Mahdawi | H01Q 1/2225 343/700 MS |
| 2008/0062046 | A1* | 3/2008 | Al-Mahdawi | H01Q 1/36 343/700 MS |
| 2008/0068174 | A1* | 3/2008 | Al-Mahdawi | H04B 5/0062 340/572.7 |
| 2008/0259826 | A1* | 10/2008 | Struhsaker | H04W 84/14 370/280 |
| 2008/0318524 | A1* | 12/2008 | Rofougaran | H01Q 1/2283 455/41.1 |
| 2009/0128204 | A1* | 5/2009 | Lim | H03L 7/18 327/161 |
| 2009/0156153 | A1* | 6/2009 | Al-Mahdawi | G06K 7/10346 340/10.5 |
| 2009/0278747 | A1* | 11/2009 | Al-Mahdawi | H01Q 1/2225 343/893 |
| 2013/0223251 | A1* | 8/2013 | Li | H04B 7/0689 370/252 |
| 2014/0241463 | A1* | 8/2014 | Leenaerts | H01Q 3/42 375/299 |
| 2016/0087335 | A1* | 3/2016 | Marr | H04B 7/0617 342/368 |
| 2017/0366242 | A1* | 12/2017 | Lee | H01Q 1/243 |
| 2018/0040964 | A1* | 2/2018 | Benjebbour | H01Q 21/06 |
| 2018/0183509 | A1* | 6/2018 | Luo | H04B 7/01 |
| 2018/0191418 | A1* | 7/2018 | Xia | H04B 7/088 |
| 2018/0269576 | A1* | 9/2018 | Scarborough | H01Q 21/0025 |
| 2018/0374180 | A1* | 12/2018 | Sprogis | G07B 15/04 |
| 2019/0058530 | A1* | 2/2019 | Rainish | H04B 7/0617 |
| 2019/0089434 | A1* | 3/2019 | Rainish | H04B 7/0617 |
| 2019/0115658 | A1* | 4/2019 | Iannotti | H04B 7/084 |
| 2019/0222296 | A1* | 7/2019 | Khandani | H04B 7/086 |
| 2019/0238204 | A1* | 8/2019 | Kim | H01Q 3/2652 |
| 2019/0288378 | A1* | 9/2019 | DiFonzo | H04B 7/18504 |
| 2019/0361088 | A1* | 11/2019 | Bajor | H04B 7/0617 |
| 2020/0083936 | A1* | 3/2020 | Gupta | H04B 1/1081 |
| 2020/0091608 | A1* | 3/2020 | Alpman | H01Q 1/2283 |
| 2020/0091622 | A1* | 3/2020 | Turpin | H01Q 5/42 |
| 2020/0119780 | A1* | 4/2020 | Klemmer | H04B 7/0421 |
| 2020/0178350 | A1* | 6/2020 | Miao | H04L 5/0055 |
| 2020/0195327 | A1* | 6/2020 | Thiagarajan | H01Q 3/42 |
| 2020/0204244 | A1* | 6/2020 | Hajimiri | H04B 7/0697 |
| 2020/0388916 | A1* | 12/2020 | Kahrizi | H04B 3/52 |
| 2021/0006333 | A1* | 1/2021 | Morton | G02B 27/00 |
| 2021/0058131 | A1* | 2/2021 | Zhu | H04B 7/063 |
| 2021/0067307 | A1* | 3/2021 | Kim | H04W 72/23 |
| 2021/0105092 | A1* | 4/2021 | Hajimiri | H04B 7/0697 |
| 2021/0144573 | A1* | 5/2021 | Yoon | H04B 17/318 |
| 2021/0210870 | A1* | 7/2021 | Tzadok | H01Q 21/061 |
| 2021/0296783 | A1* | 9/2021 | Rostomyan | H01Q 1/2283 |
| 2021/0306075 | A1* | 9/2021 | Morton | G02B 27/00 |
| 2021/0391853 | A1* | 12/2021 | Jann | H03M 1/502 |
| 2021/0391904 | A1* | 12/2021 | Jam | H04W 72/046 |
| 2022/0086898 | A1* | 3/2022 | Pezeshki | H04W 74/0833 |
| 2022/0321185 | A1* | 10/2022 | Pepin | H04B 17/11 |
| 2022/0360303 | A1* | 11/2022 | Rainish | H04B 7/0617 |
| 2023/0093195 | A1* | 3/2023 | Milroy | H01Q 3/28 455/273 |
| 2023/0136372 | A1* | 5/2023 | Ratnam | H04B 7/01 375/267 |
| 2023/0147423 | A1* | 5/2023 | Bai | H04L 5/0048 370/329 |
| 2023/0170973 | A1* | 6/2023 | Nilsson | H04B 7/086 375/262 |
| 2023/0198552 | A1* | 6/2023 | Ouchi | H04B 17/364 455/552.1 |
| 2023/0198560 | A1* | 6/2023 | Tiebout | H03F 1/3252 375/297 |
| 2023/0231599 | A1* | 7/2023 | Al-Mahdawi | H04B 7/0473 375/262 |
| 2023/0300826 | A1* | 9/2023 | Zhou | H04W 72/1268 370/329 |
| 2023/0307835 | A1* | 9/2023 | Pace | H01Q 3/20 343/702 |

\* cited by examiner

DELAY COMPENSATED ANALOG BEAM FORMING NETWORK

FIELD OF DISCLOSURE

The present disclosure relates to beam forming, and more particularly to delay compensated analog beam forming networks.

BACKGROUND

Beam forming networks are often implemented in the digital domain, where the radio frequency (RF) signal is digitized using a high speed converter and subsequent processing is performed using digital components. This approach can impose relatively high size, weight, and power requirements on a transmitter or receiver that employs such digital processing. These requirements may not be suitable for many applications where size, weight, and power are constrained.

Figure 1:
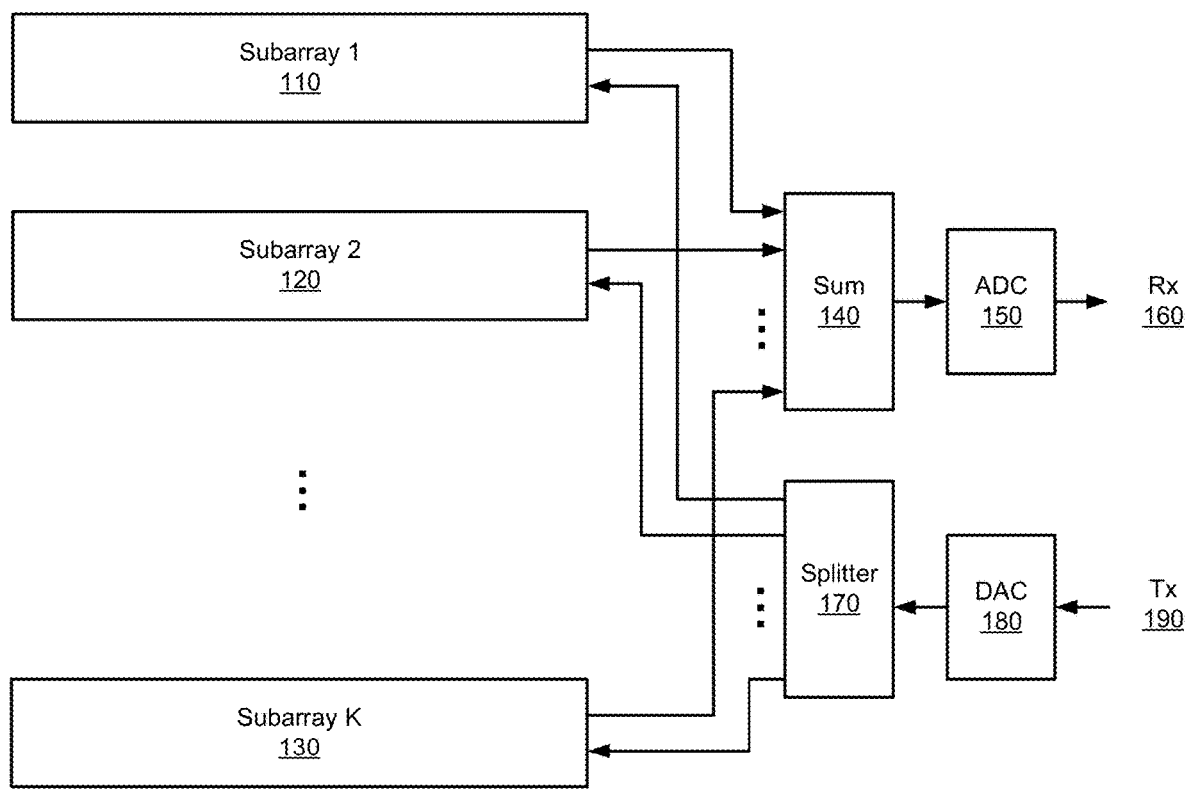
FIG. 1 is a high level block diagram of a single beam transceiver, in accordance with certain embodiments of the present disclosure.

Although the following Detailed Description will proceed with reference being made to illustrative embodiments, many alternatives, modifications, and variations thereof will be apparent in light of this disclosure.

DETAILED DESCRIPTION

Techniques are provided herein for delay compensated analog beam forming networks for phased array antennas. As noted previously, beam forming networks can be implemented in the digital domain, where the RF signal is digitized, for example using a high speed converter, and subsequent processing is performed using digital components. Such an approach, however, can impose size, weight, and power requirements on a transmitter, receiver, or transceiver, which may not be suitable for many applications where size, weight, and power are constrained, such as airborne or spaceborne platforms, or smartphones and tablets that need to be small and power efficient.

To this end, and in accordance with an embodiment of the present disclosure, a delay compensated analog beam forming network is disclosed which provides reduced size, weight, and power consumption relative to a digital beam forming network, and is more easily scalable for multi-beam phased array antennas. Compensation is provided for propagation delay between elements of the network such that signals arrive at the network endpoint with substantially equal delay, which reduces beam pointing frequency dependence. Additionally, beam forming multiplications and additions are performed at baseband or low intermediate frequency (IF), which allows for smaller delay elements with reduced loss, and the use of low frequency analog technology components which are relatively lower cost. Further still, conversions between analog and digital signals are performed at baseband or IF frequencies so that lower clock speeds may be used for additional savings in cost and power.

The disclosed networks can be used, for instance, with transmitters and/or receivers (e.g., transceiver systems) in a wide variety of applications including, for example, radar systems and communication systems that can be deployed on aircraft (manned and unmanned), guided munitions and projectiles, space-based systems, electronic warfare systems, and other communication systems including cellular telephones, and smartphones, although other applications will be apparent. In a more general sense, the disclosed techniques are useful for any systems in which directional signals are received and/or transmitted. In accordance with an embodiment, a transceiver includes an array of circuit elements, each of the circuit elements coupled to an antenna. The circuit elements comprise an analog frequency converter, an analog beam weighting circuit, and an analog delay element. The analog frequency converter is configured to up-convert a first analog signal to a first RF signal for transmission, and to down-convert a second RF signal to a second analog signal for reception. The analog beam weighting circuit is configured to apply a beam weight to the first analog signal and the second analog signal to form a beam for the transmission and the reception. The beam weight is based on the position of the circuit element in the array. The analog delay element is configured to impart a time delay to the first analog signal and the second analog signal. The time delay is also based on the position of the circuit element in the array. The transceiver also includes a digital to analog converter (DAC) configured to convert a digital signal, for transmission, into the first analog signal. The transceiver further includes an analog to digital converter (ADC) configured to convert the second analog signal to a received digital signal.

It will be appreciated that the techniques described herein may provide improved beamforming networks at lower size, weight, cost, and power consumption, compared to digital networks. The disclosed techniques can thus also provide improved scalability to larger arrays of antennas. Numerous embodiments and applications will be apparent in light of this disclosure.

System Architecture

FIG. 1 is a high level block diagram of a single beam transceiver 100, in accordance with certain embodiments of the present disclosure. The transceiver 100 is shown to include one or more subarrays 110, 120, 130, a summing circuit 140, an ADC 150, a splitter 170, and a DAC 180. The subarrays will be described in greater detail below, but at a high level they comprise antennas and associated analog circuit elements that are configured to transmit and/or receive signals at a relatively high frequency (e.g., RF signals). In particular, the circuit elements perform frequency conversion (and other RF front end functions), beamforming, and delay compensation, as will be described below. In the receive direction, signals that are received by each subarray are summed by summing circuit 140 and then converted from analog to digital format by ADC 150 to provide a received digital signal 160. The input to the summer 140 may be referred to as the sink point of the subarrays. Working in the other direction, digital signals 190 that are to be transmitted are converted to analog signals by DAC 180 and then split by splitter 170 and provided to each subarray. The output of the splitter 170 may be referred to as the feed point for the subarrays. In some embodiments a single subarray comprising two or more antennas may be employed, while in other embodiments, multiple (K) subarrays (e.g., an array of subarrays) may be employed. The number of antennas and subarrays will depend on the application requirements and the space that is available for antenna deployment. In general, more antennas will provide better signal transmission and reception (e.g., higher signal to noise ratio, narrower beams, signal diversity, etc.). The physical layout of antennas and subarrays can be designed to achieve desired performance objectives. Although both receiver and transmitter configurations are shown, it will be appreciated that in some embodiments, a subarray or array of subarrays may be configured to only transmit or receive.

Figure 2:
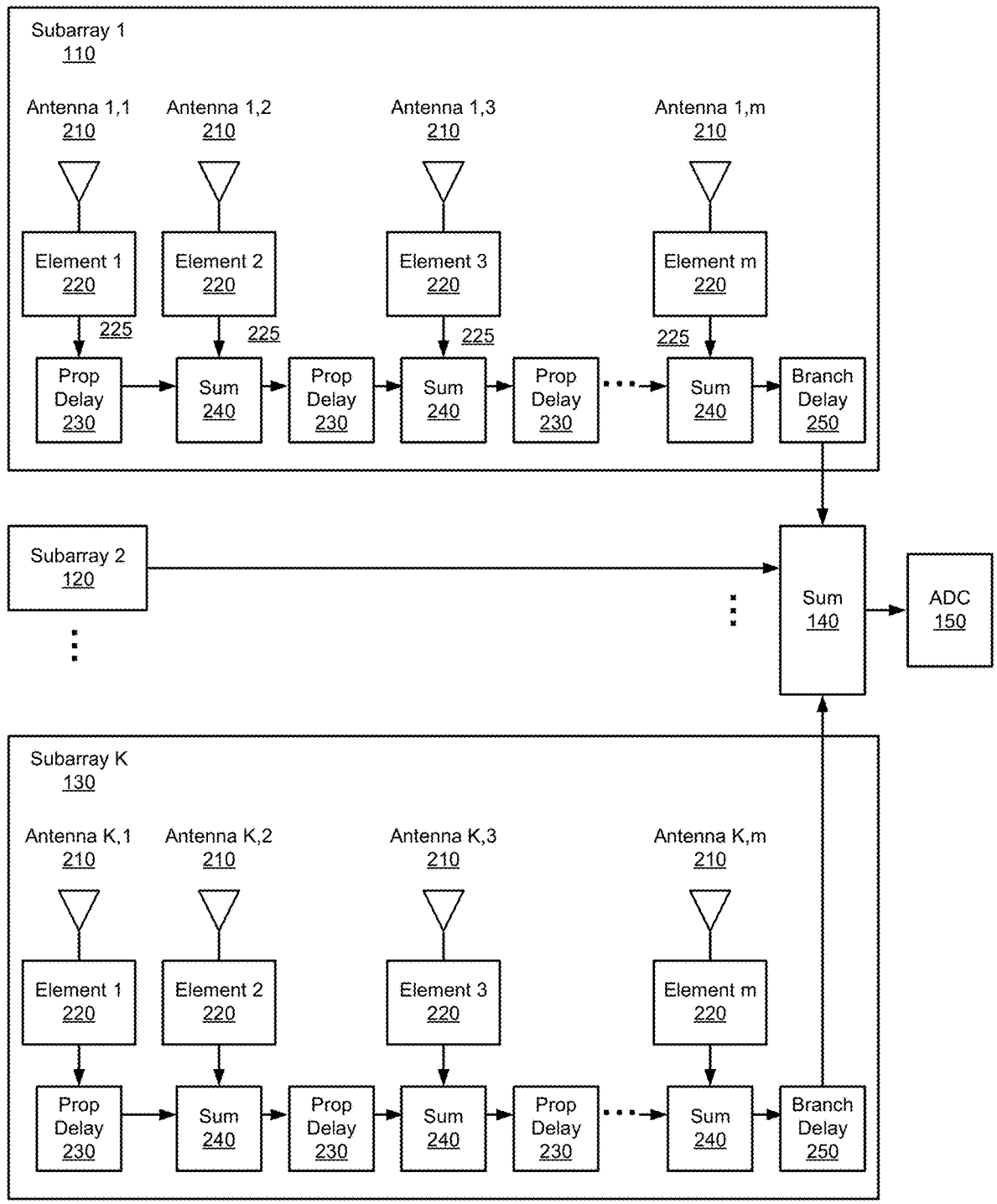
FIG. 2 is a block diagram of receiver subarrays of the transceiver of FIG. 1, configured in accordance with certain embodiments of the present disclosure.

FIG. 2 is a block diagram 200 of receiver subarrays of the transceiver 100 of FIG. 1, configured in accordance with certain embodiments of the present disclosure. Subarray 1 110 is shown to include m antennas 210 and m associated circuit elements 220. Subarrays 2 through K may be configured in the same manner, although different numbers of antennas and circuit elements (other than m) may be used in some embodiments. As shown, the analog signal output 225 of circuit element 1 is summed, by summing circuit or active coupler 240, with the output 225 of circuit element 2, which is then summed with the output 225 of circuit element 3, and so on down the line (or branch) of the subarray. Also as shown, the output of circuit element 1, as well as the output of each summer 240, is subject to a propagation delay 230 as the signal travels down the electrical path that couples the components. The summation of the analog signals is also subject to a final branch propagation delay 250 which is imparted by the electrical path from the subarray branch to the summer circuit 140. These propagation delays 230 and 250 may vary from one subarray to another subarray. Without correction, as described below, these propagation delays introduce a frequency dependent deviation in steering angle, which is a beamforming error sometimes referred to as beam squint.

Figure 3:
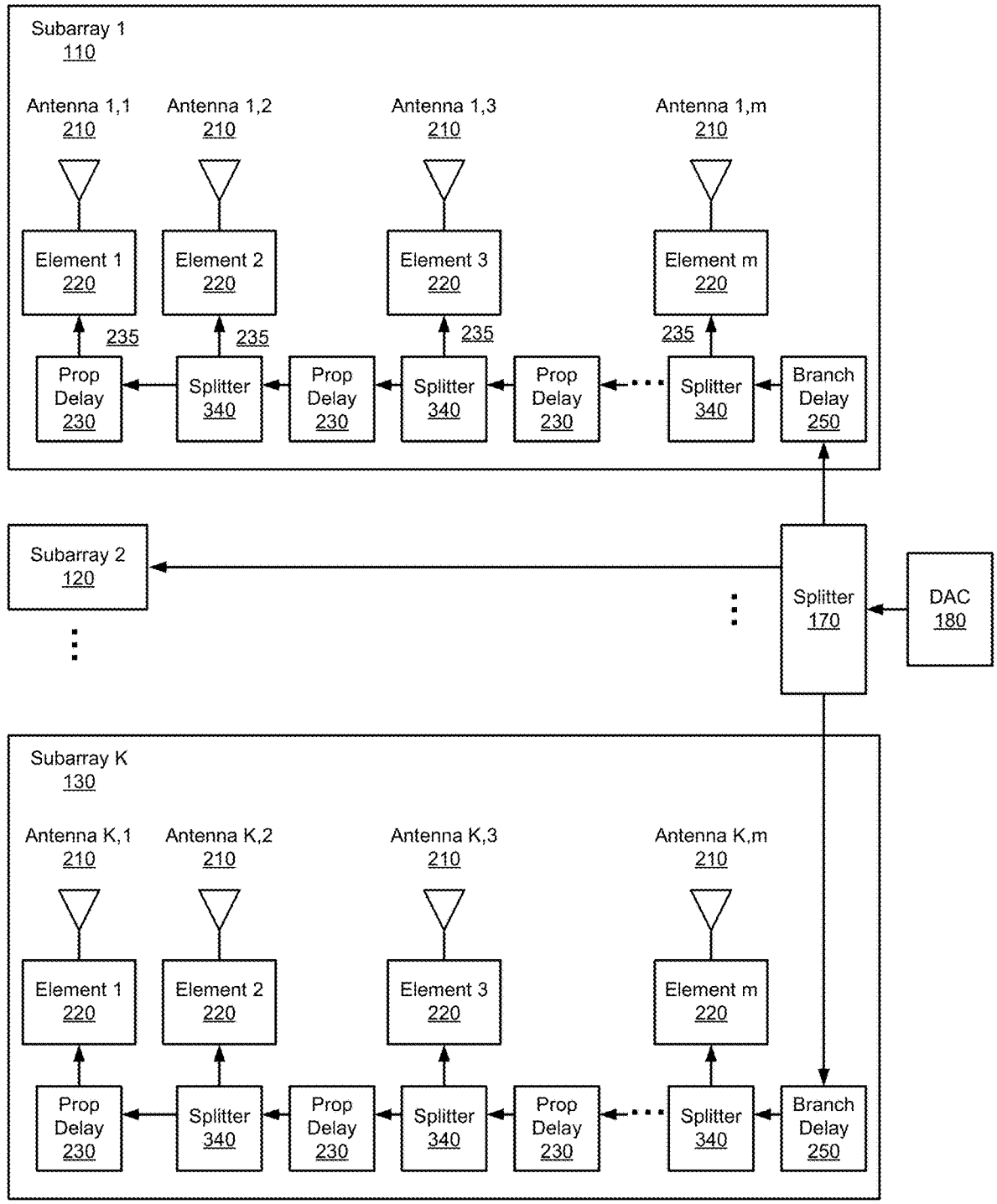
FIG. 3 is a block diagram of transmitter subarrays of the transceiver of FIG. 1, configured in accordance with certain embodiments of the present disclosure.

FIG. 3 is a block diagram 300 of transmitter subarrays of the transceiver 100 of FIG. 1, configured in accordance with certain embodiments of the present disclosure. Subarray 1 110 is again shown to include m antennas 210 and m associated circuit elements 220, but the signal flow is in the opposite direction relative to the receiver configuration described above. As shown, the analog signal that is split (by splitter 170) into the branch of the subarray is further split (by splitters 340) into an analog TX signal 235 as input to each circuit element 220 as it propagates down the branch. As previously described, the analog signal 235 is subject to propagation delays 230 and 250, which may be corrected, as described below.

Figure 4:
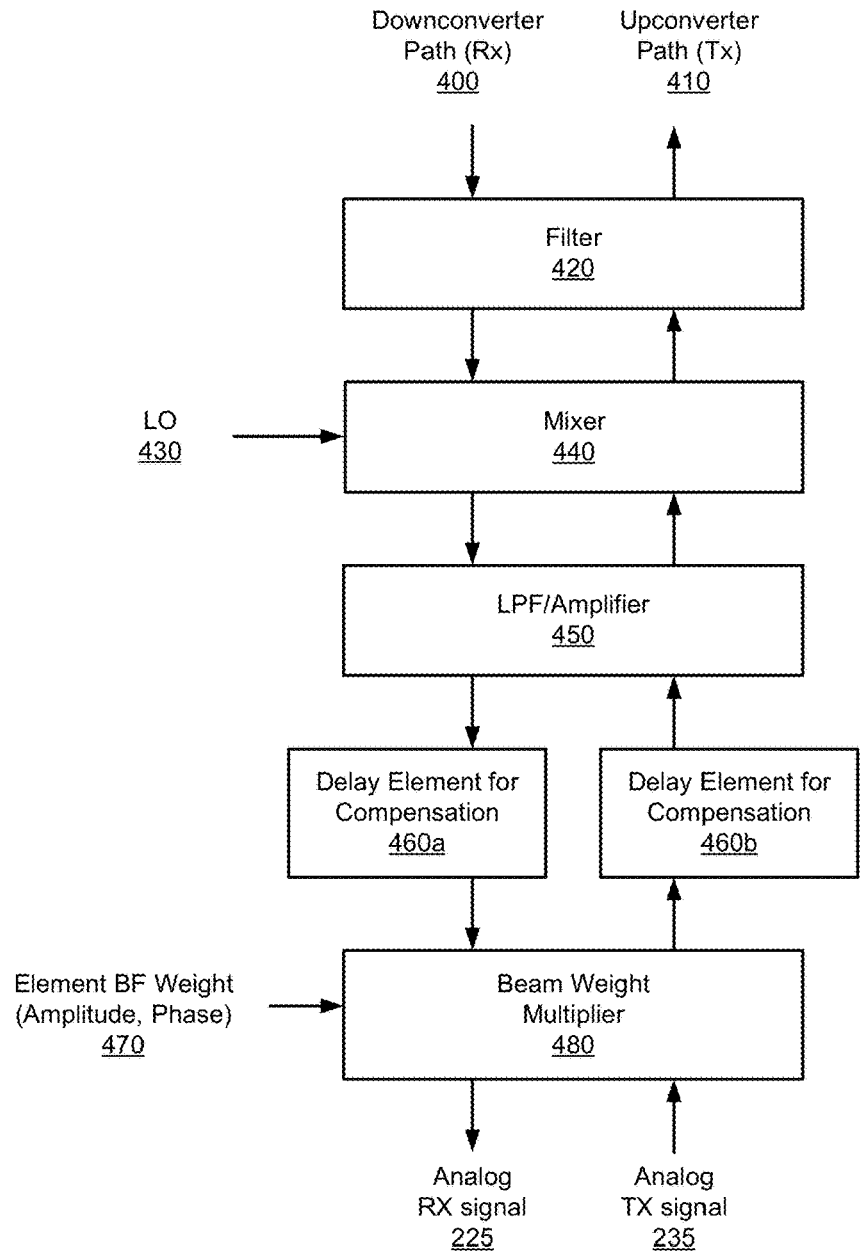
FIG. 4 is a block diagram of the circuit elements of the subarrays of FIGS. 2 and 3, configured in accordance with certain embodiments of the present disclosure.

FIG. 4 is a block diagram of the circuit elements 220 of the subarrays of FIGS. 2 and 3, configured in accordance with certain embodiments of the present disclosure. The single beam circuit element 220 is shown to include a filter 420, a mixer 440, a low pass filter and amplifier 450, an analog delay elements 460a and 460b, and a beam weight multiplier 480. In some embodiments, these components may be shared between the downconverter path 400 (for the receiver) and the upconverter path 410 (for the transmitter). In some embodiments, some of the elements may differ between transmit and receive paths, such as, for example, the delay elements 460a and 460b which may be configured to compensate for propagation delays that can differ between the transmit and receive paths.

The filter 420 is configured to perform RF front end filtering (e.g., bandpass filtering) to remove signals and noise outside of the frequency band of interest that contains the RF signal to be received or transmitted. The filter 420 may also remove aliased images of the signal for transmission that may be generated by the mixer 440.

The mixer 440 is configured to mix a local oscillator (LO) signal 430 with the receiver RF signal to frequency down convert the received signal to an IF or baseband frequency analog signal. The mixer 440 is also configured to mix the LO signal 430 with the IF or baseband analog signal to frequency up convert the analog signal to an RF signal for transmission.

The low pass filter and amplifier 450 are configured to further filter unwanted noise and other signals including aliased images of the received signal that may be generated by the mixer 440, and to provide any desired amplification.

The analog delay element 460 (e.g., 460a and 460b) is configured to delay the analog signals by a time delay that is selected to compensate for the propagation delays 230 along the branch. The selected time delay is based on the position of the circuit element in the subarray. For example, the delay for circuit element 1 may set to zero, while the delay for circuit element m may be set to a maximum value (e.g., the sum of all propagation delays). Said differently, in order to equalize the delay between each element and the feed/sink point, the delay compensation progressively increases along the branch, moving from the first element to the feed/sink point. In some embodiments, an additional delay value (not shown, but located between the subarray and the feed/sink point) may be imparted to compensate for the branch delay 250 if the branch delays differ between subarrays. In some embodiments, the analog delay element is implemented as a printed circuit board or a transmission line segment.

The beam weight multiplier 480 is configured to apply a beam weight 470 (e.g., a complex value associated with an amplitude and phase) to the analog receive and transmit signals 225, 235. Each circuit element 220 can apply a different beam weight that is based on the position of the circuit element in the subarray so as to form a beam that is steered to a desired direction. In some embodiments, the beam weights may be obtained from a beam excitation table that stores precomputed beam weights for each circuit element and for each desired steering direction.

Figure 5:
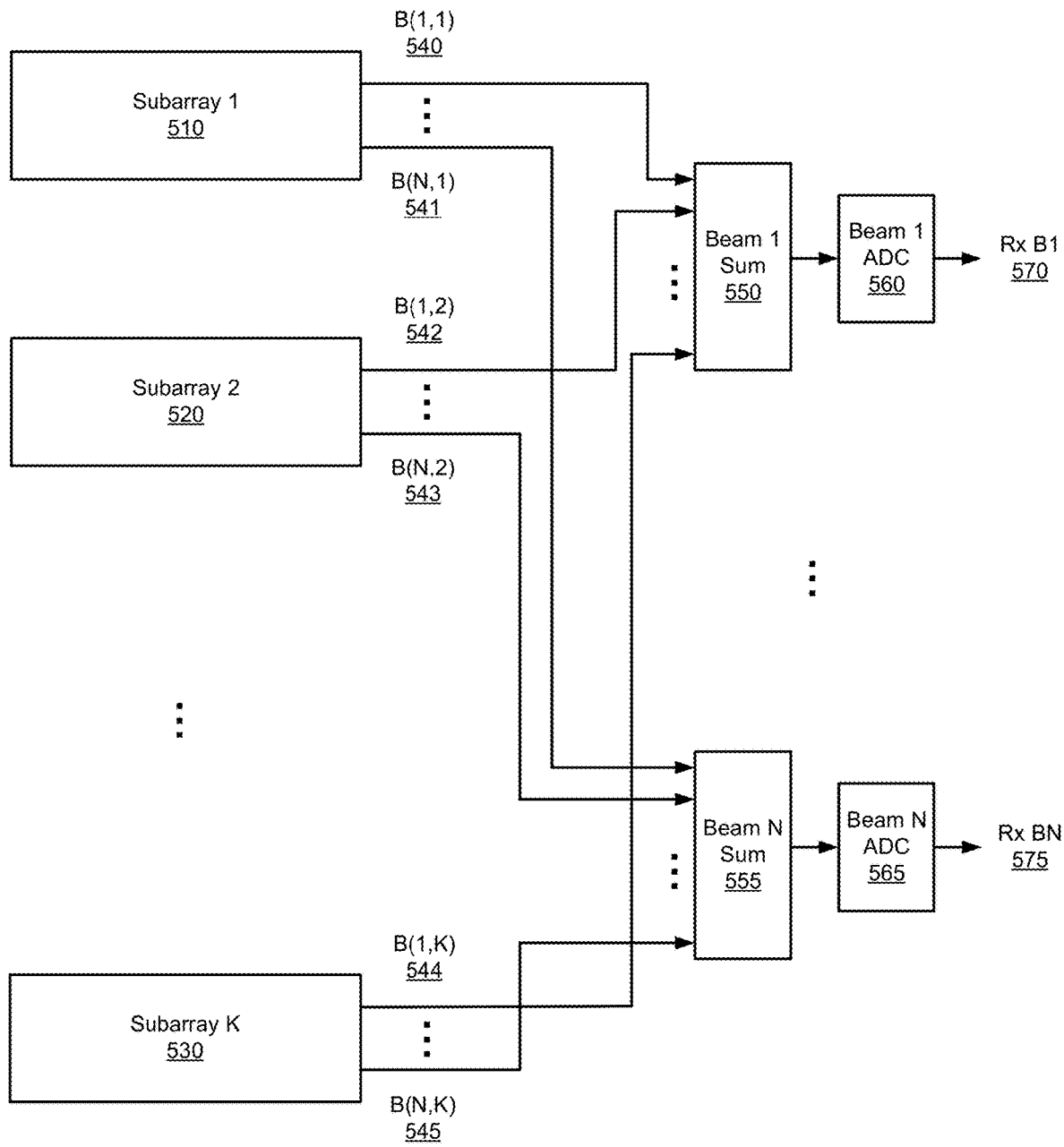
FIG. 5 is a high level block diagram of a multi-beam receiver, in accordance with certain embodiments of the present disclosure.

FIG. 5 is a high level block diagram of a multi-beam (N-beam) receiver 500, in accordance with certain embodiments of the present disclosure. The receiver 500 is shown to include one or more (K) subarrays 510, 520, 530, N summing circuits 550, . . . 555, and N ADCs 560, . . . 565. The subarrays 510, 520, 530 are similar to the subarrays 110, 120, 130, described previously, but they are configured to steer beams in multiple (N) directions. Each of the K subarrays provides a set of received signals from N beam directions. For example, subarray 1 provides a set of beams B(1,1) 540 through B(N,1) 541, subarray 2 provides beams B(1,2) 542 through B(N,2) 543, and subarray K provides beams B(1,K) 544 through B(N,K) 545. Beam 1 summing circuit 550 sums the first beam from each of the K subarrays, and so on, up through beam N summing circuit 555, which sums the Nth beam from each of the K subarrays. The output of each beam summing circuit is then provided to an ADC 560, . . . 565, to convert the analog signal in the steered beam to a digital received analog signal in that received beam Rx B1 570, Rx BN 575.

Figure 6:
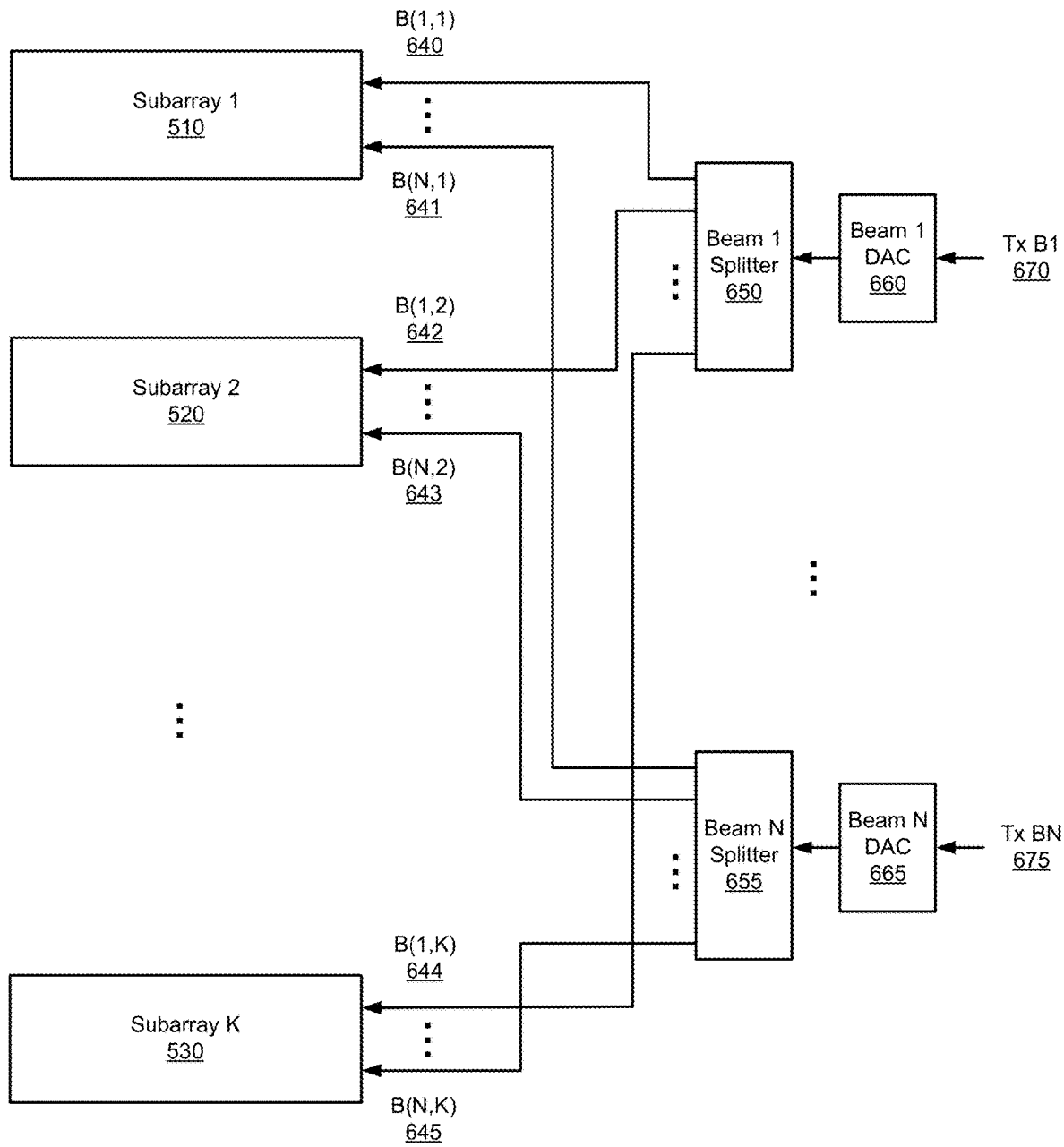
FIG. 6 is a high level block diagram of a multi-beam transmitter, in accordance with certain embodiments of the present disclosure.

FIG. 6 is a high level block diagram of a multi-beam (N-beam) transmitter 600, in accordance with certain embodiments of the present disclosure. The transmitter 600 is shown to include the one or more (K) subarrays 510, 520, 530, N splitter circuits 650, . . . 655, and N DACs 660, . . . 665. Each of the DACs convert a digital signal for transmission in a particular beam Tx B1 670, . . . Tx BN 675, to an analog signal. Each of the analog signals, associated with one of the N beams, is split by beam splitters 650, . . . 655 to be provided to each of the K subarrays 510, . . . 530. The subarrays 510, 520, 530 are again similar to the subarrays 110, 120, 130, described previously, but they are configured to steer beams in multiple (N) directions. Each of the K subarrays transmits signals in N beam directions. For example, subarray 1 transmits the set of beams B(1,1) 640 through B(N,1) 641, subarray 2 transmits beams B(1,2) 642 through B(N,2) 643, and subarray K transmits beams B(1,K) 644 through B(N,K) 645.

Figure 7:
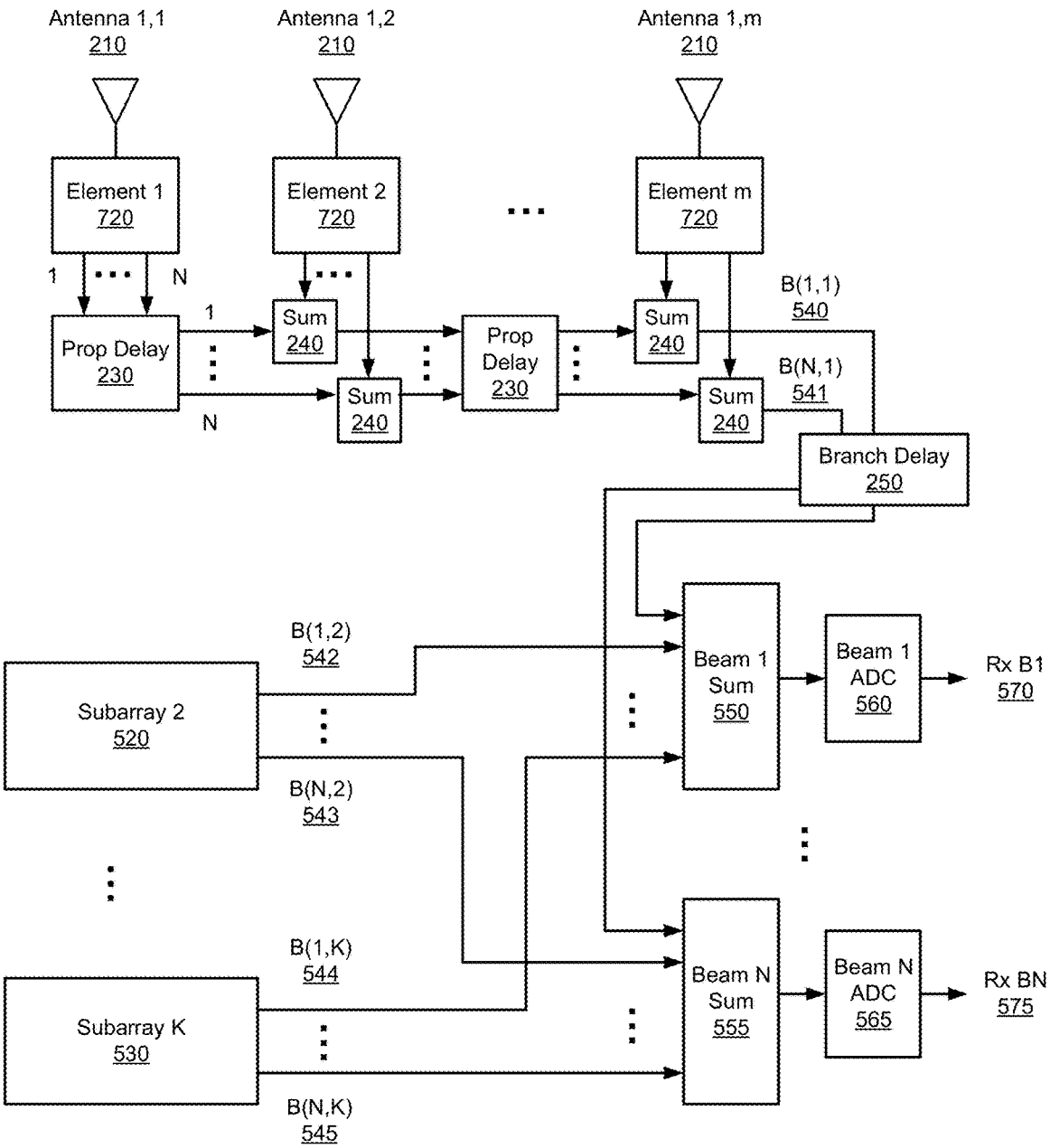
FIG. 7 is a block diagram of a subarray of the multi-beam receiver of FIG. 5, configured in accordance with certain embodiments of the present disclosure.

FIG. 7 is a block diagram 700 of a subarray of the multi-beam receiver of FIG. 5, configured in accordance with certain embodiments of the present disclosure. Subarray 1 510 is shown to include m antennas 210 and m associated circuit elements 720. Subarrays 2 through K may be configured in the same manner, although different numbers of antennas and circuit elements (other than m) may be used in some embodiments. As shown, the circuit elements 720 each provide N analog received signal outputs, one for each beam. The first beam output of circuit element 1 is summed, by summing circuit 240, with the first beam output of circuit element 2, which is then summed with the first beam output of circuit element 3, and so on down a line or branch of the subarray. Similarly, the Nth beam output of circuit element 1 is summed, by summing circuit 240, with the Nth beam output of circuit element 2, which is then summed with the Nth beam output of circuit element 3, and so on. The final summations, after circuit element m, result in beams B(1,1) 540 through B(N,1) 541. Also as shown, the outputs of circuit element 1, as well as the outputs of each summer 240, are subject to propagation delay 230 (and branch propagation delay 250) as previously describe in the single beam case. These propagation delays may be corrected using delay elements, as previously described.

Figure 8:
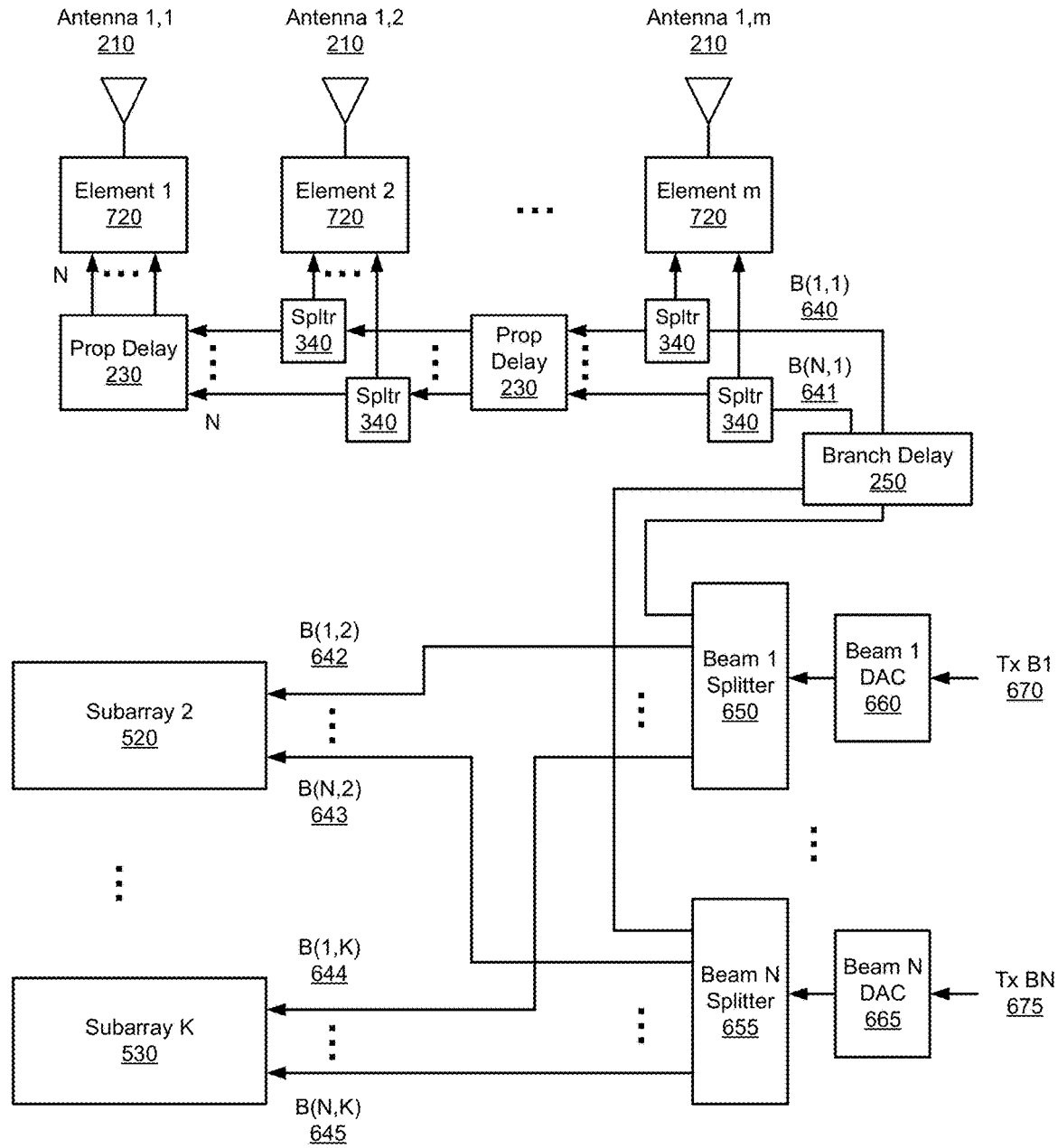
FIG. 8 is a block diagram of a subarray of the multi-beam transmitter of FIG. 6, configured in accordance with certain embodiments of the present disclosure.

FIG. 8 is a block diagram 800 of a subarray of the multi-beam transmitter of FIG. 6, configured in accordance with certain embodiments of the present disclosure. Subarray 1 510 is shown to include m antennas 210 and m associated circuit elements 720, but the signal flow is in the opposite direction relative to the receiver configuration described above. As shown, beam splitters 650, . . . 655 provide analog signals to be transmitted in each beam B(1,1) 640 through B(N,1) 641. The N analog transmit signals for each beam are further split (by splitters 340) into an analog TX signal for input to each circuit element 720 as they propagate down the branch. These signals are subject to propagation delay 230 (and branch propagation delay 250) as previously described in the single beam case, which may be corrected, as previously described.

Figure 9:
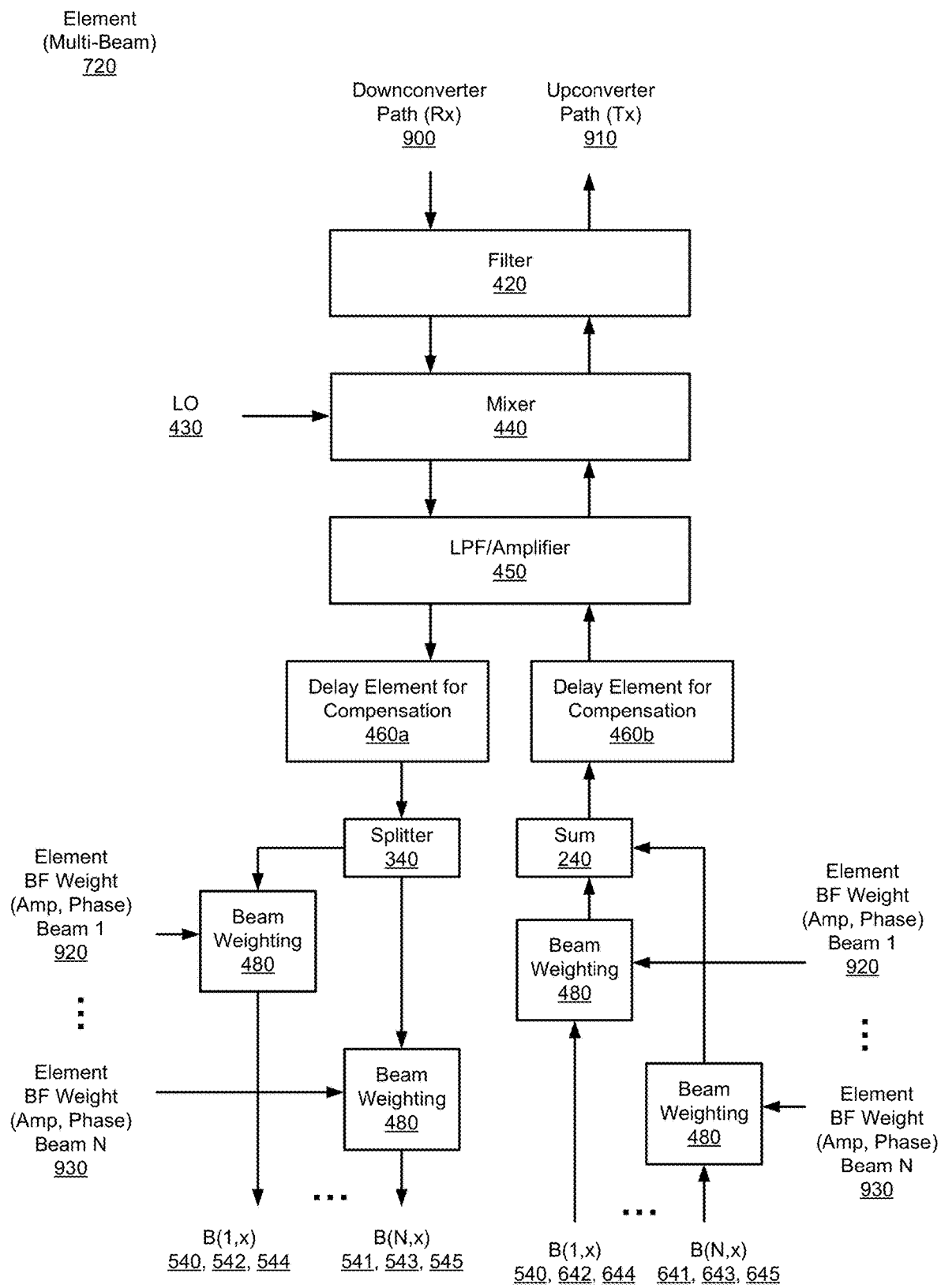
FIG. 9 is a block diagram of the circuit elements of the subarrays of FIGS. 7 and 8, configured in accordance with certain embodiments of the present disclosure.

FIG. 9 is a block diagram of the circuit elements 720 of the subarrays of FIGS. 7 and 8, configured in accordance with certain embodiments of the present disclosure. The multi-beam circuit element 720 is shown to include filter 420, mixer 440, low pass filter and amplifier 450, and delay element 460 (e.g., 460a and 460b), which function as previously described for single beam circuit element 220. Additionally, however, in some embodiments, there are N beam weight multiplier circuits 480 for the downconverter path 900 (for the receiver) and the upconverter path 910 (for the transmitter). Each beam weight multiplier circuit 480 applies a beamforming weight 920, . . . 930 to the analog signals that are received or transmitted to steer those signals to one of the N beams. In the receiver path 900, the down-converted signal is split N ways, by splitter 340, and provided to each of the beam weight multipliers. In the transmitter path 910, the N analog signals are each multiplied by the beam weights and then summed, by summing circuit 240, for transmission.

Each circuit element 220 can apply a different set of N beam weights that is based on the position of the circuit element in the subarray so as to form N beams that are steered to desired directions. In some embodiments, the beam weights may be obtained from a beam excitation table that stores precomputed beam weights for each circuit element and for each desired steering direction.

Methodology

Figure 10:
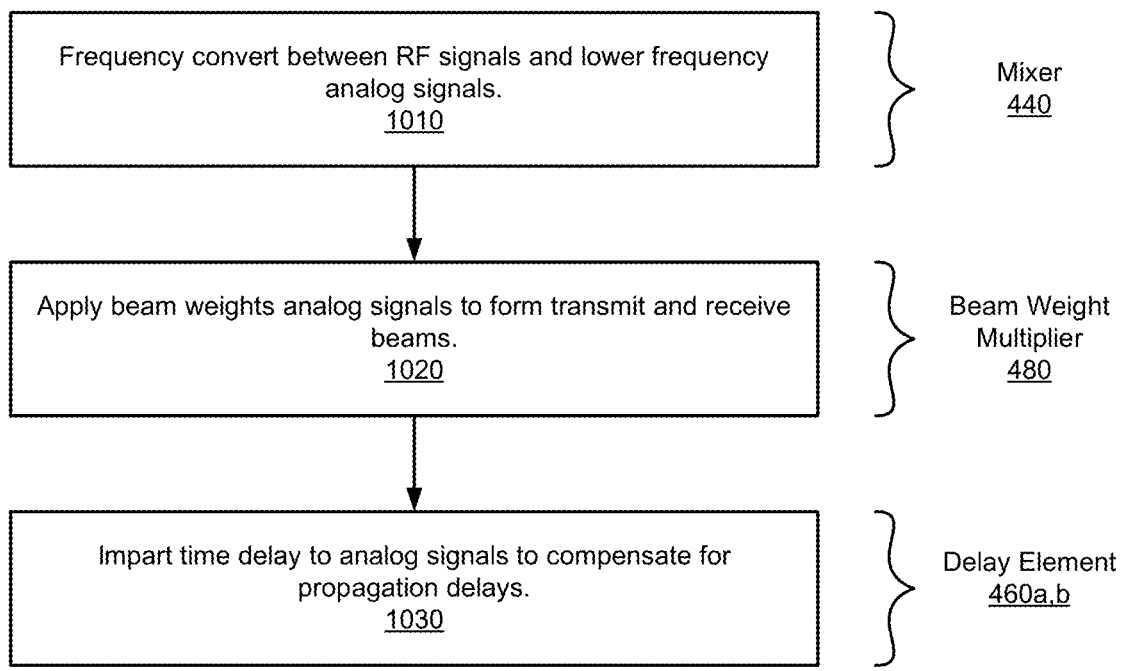
FIG. 10 is a flowchart illustrating methodology for delay compensated beam forming, in accordance with an embodiment of the present disclosure.

FIG. 10 is a flowchart illustrating a methodology 1000 for delay compensated beam forming, in accordance with an embodiment of the present disclosure. As can be seen, example method 1000 includes a number of phases and sub-processes, the sequence of which may vary from one embodiment to another. However, when considered in aggregate, these phases and sub-processes form a process for delay compensated analog beam forming, in accordance with certain of the embodiments disclosed herein, for example as illustrated in FIGS. 1-9, as described above. However other system architectures can be used in other embodiments, as will be apparent in light of this disclosure. To this end, the correlation of the various functions shown in FIG. 10 to the specific components illustrated in the figures, is not intended to imply any structural and/or use limitations. Rather other embodiments may include, for example, varying degrees of integration wherein multiple functionalities are effectively performed by one system. Numerous variations and alternative configurations will be apparent in light of this disclosure.

In one embodiment, method 1000 commences, at operation 1010, by frequency converting an analog signal for transmission from a lower frequency (e.g., IF or baseband) to a higher frequency (e.g., RF), and frequency converting a received signal from a higher frequency (e.g., RF) to a lower frequency analog signal (e.g., IF or baseband). In some embodiments, the transmission and reception occur through antennas of an array of antennas, and each antenna is coupled to a circuit element that performs the frequency conversions.

At operation 1020, a beam weight is applied to the analog signals to form a beam (for transmission or reception). The beam weight is applied by the circuit element and the weight is dependent on the position of the circuit element in the array. In some embodiments, the analog signals may be split into multiple transmit and receive signals and different beam weights may be applied to each so that the signals may be steered to different beams.

At operation 1030, a time delay is imparted to the lower frequency analog signals. The time delay is based on the position of the circuit element in the array and is selected to compensate for the propagation delay of the analog signals along the electrical path that couples the circuit elements of the array. In some embodiments, the time delay is fixed for all frequencies and beam angles, and depends only on the position of the circuit element in the array.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical entities within the registers, memory units, or other such information storage transmission or displays of the computer system. The embodiments are not limited in this context.

The terms "circuit" or "circuitry," as used in any embodiment herein, are functional structures that include hardware, or a combination of hardware and software, and may comprise, for example, singly or in any combination, hardwired circuitry, programmable circuitry such as computer processors comprising one or more individual instruction processing cores, state machine circuitry, and/or gate level logic. The circuitry may include a processor and/or controller programmed or otherwise configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., non-volatile) in memory devices. The circuitry may, collectively or individually, be embodied as circuitry that forms part of a larger system, for example, an integrated circuit (IC), an application-specific integrated circuit (ASIC), a system-on-a-chip (SoC), communications system, radar system, desktop computers, laptop computers, tablet computers, servers, smartphones, etc. Other embodiments may be implemented as software executed by a programmable device. In any such hardware cases that include executable software, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood, however, that other embodiments may be practiced without these specific details, or otherwise with a different set of details. It will be further appreciated that the specific structural and functional details disclosed herein are representative of example embodiments and are not necessarily intended to limit the scope of the present disclosure. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

FURTHER EXAMPLE EMBODIMENTS

The following examples pertain to further embodiments, from which numerous permutations and configurations will be apparent.

One example embodiment of the present disclosure provides a transceiver comprising: an array of circuit elements, each of the circuit elements coupled to an antenna, the circuit elements including an analog frequency converter configured to up-convert a first analog signal to a first radio frequency (RF) signal for transmission, and to down-convert a second RF signal to a second analog signal for reception, an analog beam weighting circuit configured to apply a beam weight to both of the first analog signal and the second analog signal to form a beam for the transmission and the reception, the beam weight based on a position of the circuit element in the array, and an analog delay element configured to impart a time delay to the first analog signal and the second analog signal, the time delay based on the position of the circuit element in the array; a digital to analog converter (DAC) configured to convert a digital signal, for transmission, into the first analog signal; and an analog to digital converter (ADC) configured to convert the second analog signal to a received digital signal.

In some cases, the time delay is selected to compensate for a propagation delay of the first analog signal and the second analog signal, the propagation delay associated with an electrical path coupling between the circuit elements of the array. In some cases, the analog delay element is implemented as a printed circuit board or a transmission line segment. In some cases, the beam weight applied to both of the first and second analog signals is a first beam weight, and the analog beam weighting circuit is configured to apply a second beam weight to both of the first analog signal and the second analog signal to form a second beam for the transmission and reception.

Another example embodiment of the present disclosure provides an analog beamforming receiver network comprising a subarray, the subarray including: a first circuit element configured to receive a radio frequency (RF) signal from a first antenna, frequency down-convert the RF signal received from the first antenna to a first lower frequency (LF) signal, and multiply the first LF signal by a first-element beam forming weight to generate a first-element output signal; a second circuit element configured to receive the RF signal from a second antenna, frequency down-convert the RF signal received from the second antenna to a second LF signal, delay the second LF signal by a time delay, and multiply the delayed second LF signal by a second-element beam forming weight to generate a second-element output signal; and a summing circuit configured to sum the first-element output signal and the second-element output signal to generate an output signal of the subarray.

In some cases, the time delay is selected to compensate for a propagation delay of the first-element output signal, the propagation delay associated with an electrical path coupling the first element circuit and the summing circuit. In some cases, the subarray is a first subarray, the network comprises a second subarray, and the network further comprises: a subarray summing circuit configured to generate a sum of the output signal of the first subarray and the output signal of the second sub array; and an analog to digital converter (ADC) configured to convert the sum generated by the subarray summing circuit to a received digital signal. In some cases, the first-element beam forming weight and the second-element beam forming weight are selected to form a single beam. In some cases, the first-element beam forming weight is a first first-element beam forming weight, the first-element output signal is a first first-element output signal, the second-element beam forming weight is a first second-element beam forming weight, the second-element output signal is a first second-element output signal, the output signal of the subarray is a first output signal of the subarray, and the first circuit element is further configured to multiply the first LF signal by a second first-element beam forming weight to generate a second first-element output signal; the second circuit element is further configured to multiply the delayed second LF signal by a second second-element beam forming weight to generate a second second-element output signal; and the summing circuit is further configured to sum the second first-element output signal and the second second-element output signal to generate a second output signal of the subarray. In some such cases, the first first-element beam forming weight and the first second-element beam forming weight are selected to form a first beam and the second first-element beam forming weight and the second second-element beam forming weight are selected to form a second beam. In some cases, the second circuit element further comprises a delay element configured to delay the second LF signal by the time delay, the delay element implemented as a printed circuit board or a transmission line segment. In some cases, the first LF signal and the second LF signal are at an intermediate frequency (IF) or a baseband frequency, the IF and baseband frequency lower than the frequency of the RF signal.

Another example embodiment of the present disclosure provides an analog beamforming transmitter network comprising a subarray, the subarray including: a splitter circuit configured to split an input signal to the subarray into a first-element input signal and a second-element input signal; a first circuit element configured to multiply the first-element input signal by a first-element beam forming weight to generate a first low frequency (LF) signal, frequency up-convert the first LF signal to a first radio frequency (RF) signal for transmission through a first antenna; and a second circuit element configured to multiply the second-element input signal by a second-element beam forming weight to generate a second LF signal, delay the second LF signal by a time delay, frequency up-convert the delayed second LF signal to a second RF signal for transmission through a second antenna.

In some cases, the time delay is selected to compensate for a propagation delay of the first-element input signal, the propagation delay associated with an electrical path coupling the first element circuit and the splitter circuit. In some cases, the subarray is a first subarray, the network comprises a second subarray, and the network further comprises: a digital to analog converter (DAC) configured to convert a digital signal for transmission into an analog signal for transmission; and a subarray splitter circuit configured to split the analog signal for transmission into the input signal to the first subarray and the input signal to the second subarray. In some cases, the first-element beam forming weight and the second-element beam forming weight are selected to form a single beam. In some cases, the first-element beam forming weight is a first first-element beam forming weight, the first-element input signal is a first first-element input signal, the second-element beam forming weight is a first second-element beam forming weight, the second-element input signal is a first second-element input signal, the input signal to the subarray is a first input signal to the subarray, and the splitter circuit is further configured to split a second input signal to the subarray into a second first-element input signal and a second second-element input signal; the first circuit element is further configured to multiply the second first-element input signal by a second first-element beam forming weight to generate a third LF signal for summation with the first LF signal; and the second circuit element is further configured to multiply the second second-element input signal by a second second-element beam forming weight to generate a fourth LF signal for summation with the second LF signal. In some such cases, the first first-element beam forming weight and the first second-element beam forming weight are selected to form a first beam and the second first-element beam forming weight and the second second-element beam forming weight are selected to form a second beam. In some cases, the second circuit element further comprises a delay element configured to delay the second LF signal by the time delay, the delay element implemented as a printed circuit board or a transmission line segment. In some cases, the first LF signal and the second LF signal are at an intermediate frequency (IF) or a baseband frequency, the IF and baseband frequencies lower than the frequency of the first RF signal and the second RF signal.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be appreciated in light of this disclosure. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner and may generally include any set of one or more elements as variously disclosed or otherwise demonstrated herein.

What is claimed is:

1. A transceiver comprising:
an array of circuit elements, each of the circuit elements coupled to an antenna, the circuit elements including an analog frequency converter configured to up-convert a first analog signal to a first radio frequency (RF) signal for transmission, and to down-convert a second RF signal to a second analog signal for reception, an analog beam weighting circuit configured to apply a beam weight to both of the first analog signal and the second analog signal to form a beam for the transmission and the reception, the beam weight based on a position of the circuit element in the array, and an analog delay element configured to impart a time delay to the first analog signal and the second analog signal, the time delay based on the position of the circuit element in the array;

a digital to analog converter (DAC) configured to convert a digital signal, for transmission, into the first analog signal; and an analog to digital converter (ADC) configured to convert the second analog signal to a received digital signal.

2. The transceiver of claim 1, wherein the time delay is selected to compensate for a propagation delay of the first analog signal and the second analog signal, the propagation delay associated with an electrical path coupling between the circuit elements of the array.

3. The transceiver of claim 1, wherein the analog delay element is implemented as a printed circuit board or a transmission line segment.

4. The transceiver of claim 1, wherein the beam weight applied to both of the first and second analog signals is a first beam weight, and the analog beam weighting circuit is configured to apply a second beam weight to both of the first analog signal and the second analog signal to form a second beam for the transmission and reception.

5. An analog beamforming receiver network comprising a subarray, the subarray including:
- a first circuit element configured to receive a radio frequency (RF) signal from a first antenna, frequency down-convert the RF signal received from the first antenna to a first lower frequency (LF) signal, and multiply the first LF signal by a first-element beam forming weight to generate a first-element output signal;
- a second circuit element configured to receive the RF signal from a second antenna, frequency down-convert the RF signal received from the second antenna to a second LF signal, delay the second LF signal by a time delay, and multiply the delayed second LF signal by a second-element beam forming weight to generate a second-element output signal; and
- a summing circuit configured to sum the first-element output signal and the second-element output signal to generate an output signal of the subarray.

6. The network of claim 5, wherein the time delay is selected to compensate for a propagation delay of the first-element output signal, the propagation delay associated with an electrical path coupling the first element circuit and the summing circuit.

7. The network of claim 5, wherein the subarray is a first subarray, the network comprises a second subarray, and the network further comprises:
- a subarray summing circuit configured to generate a sum of the output signal of the first subarray and the output signal of the second subarray; and
- an analog to digital converter (ADC) configured to convert the sum generated by the subarray summing circuit to a received digital signal.

8. The network of claim 5, wherein the first-element beam forming weight and the second-element beam forming weight are selected to form a single beam.

9. The network of claim 5, wherein the first-element beam forming weight is a first first-element beam forming weight, the first-element output signal is a first first-element output signal, the second-element beam forming weight is a first second-element beam forming weight, the second-element output signal is a first second-element output signal, the output signal of the subarray is a first output signal of the subarray, and
- the first circuit element is further configured to multiply the first LF signal by a second first-element beam forming weight to generate a second first-element output signal;
- the second circuit element is further configured to multiply the delayed second LF signal by a second second-element beam forming weight to generate a second second-element output signal; and
- the summing circuit is further configured to sum the second first-element output signal and the second second-element output signal to generate a second output signal of the subarray.

10. The network of claim 9, wherein the first first-element beam forming weight and the first second-element beam forming weight are selected to form a first beam and the second first-element beam forming weight and the second second-element beam forming weight are selected to form a second beam.

11. The network of claim 5, the second circuit element further comprises a delay element configured to delay the second LF signal by the time delay, the delay element implemented as a printed circuit board or a transmission line segment.

12. The network of claim 5, wherein the first LF signal and the second LF signal are at an intermediate frequency (IF) or a baseband frequency, the IF and baseband frequency lower than the frequency of the RF signal.

13. An analog beamforming transmitter network comprising a subarray, the subarray including:
- a splitter circuit configured to split an input signal to the subarray into a first-element input signal and a second-element input signal;
- a first circuit element configured to multiply the first-element input signal by a first-element beam forming weight to generate a first low frequency (LF) signal, frequency up-convert the first LF signal to a first radio frequency (RF) signal for transmission through a first antenna; and
- a second circuit element configured to multiply the second-element input signal by a second-element beam forming weight to generate a second LF signal, delay the second LF signal by a time delay, frequency up-convert the delayed second LF signal to a second RF signal for transmission through a second antenna.

14. The network of claim 13, wherein the time delay is selected to compensate for a propagation delay of the first-element input signal, the propagation delay associated with an electrical path coupling the first element circuit and the splitter circuit.

15. The network of claim 13, wherein the subarray is a first subarray, the network comprises a second subarray, and the network further comprises:
- a digital to analog converter (DAC) configured to convert a digital signal for transmission into an analog signal for transmission; and a subarray splitter circuit configured to split the analog signal for transmission into the input signal to the first subarray and the input signal to the second subarray.

16. The network of claim 13, wherein the first-element beam forming weight and the second-element beam forming weight are selected to form a single beam.

17. The network of claim 13, wherein the first-element beam forming weight is a first first-element beam forming weight, the first-element input signal is a first first-element input signal, the second-element beam forming weight is a first second-element beam forming weight, the second-element input signal is a first second-element input signal, the input signal to the subarray is a first input signal to the subarray, and the splitter circuit is further configured to split a second input signal to the subarray into a second first-element input signal and a second second-element input signal;

the first circuit element is further configured to multiply the second first-element input signal by a second first-element beam forming weight to generate a third LF signal for summation with the first LF signal; and the second circuit element is further configured to multiply the second second-element input signal by a second second-element beam forming weight to generate a fourth LF signal for summation with the second LF signal.

18. The network of claim 17, wherein the first first-element beam forming weight and the first second-element beam forming weight are selected to form a first beam and the second first-element beam forming weight and the second second-element beam forming weight are selected to form a second beam.

19. The network of claim 13, the second circuit element further comprises a delay element configured to delay the second LF signal by the time delay, the delay element implemented as a printed circuit board or a transmission line segment.

20. The network of claim 13, wherein the first LF signal and the second LF signal are at an intermediate frequency (IF) or a baseband frequency, the IF and baseband frequencies lower than the frequency of the first RF signal and the second RF signal.

* * * * *